United States Patent [19]
Billingham et al.

[11] Patent Number: 5,950,455
[45] Date of Patent: Sep. 14, 1999

[54] CRYOGENIC AIR SEPARATION SYSTEM FOR FEED AIR FLOW DISTURBANCES

[75] Inventors: John Fredric Billingham, Getzville; Walter Joseph Olszewski, Amherst; John Peter Ricotta, Buffalo, all of N.Y.

[73] Assignee: Praxair Technology, Inc., Danbury, Conn.

[21] Appl. No.: 09/052,969

[22] Filed: Apr. 1, 1998

[51] Int. Cl.[6] .................................................. F25J 1/00
[52] U.S. Cl. ................................................ 62/643; 62/906
[58] Field of Search ........................... 62/643, 906

[56] References Cited

U.S. PATENT DOCUMENTS

| | | | |
|---|---|---|---|
| 2,940,168 | 6/1960 | Monroe | 29/419 |
| 3,218,048 | 11/1965 | Smith | 261/94 |
| 5,419,136 | 5/1995 | McKeigue | 62/906 |
| 5,644,932 | 7/1997 | Dunbobbin et al. | 62/640 |
| 5,653,126 | 8/1997 | Harada et al. | 62/643 |

OTHER PUBLICATIONS

"Packed Column Internals", Chen, Chemical Engineering, Mar. 5, 1984, pp. 40–51.

*Primary Examiner*—Ronald Capossela
*Attorney, Agent, or Firm*—Stanley Ktorides

[57] ABSTRACT

A cryogenic air separation system wherein separation inefficiencies resulting from feed air flow disturbances due to discontinuous prepurifier operation are reduced or eliminated by inhibiting column liquid drainage during such disturbances using mesh packing having interspacial regions which hold up the liquid during the disturbances using surface tension.

10 Claims, 4 Drawing Sheets

CRYOGENIC AIR SEPARATION SYSTEM FOR FEED AIR FLOW DISTURBANCES

TECHNICAL FIELD

This invention relates generally to cryogenic rectification of feed air.

BACKGROUND ART

The operation of a cryogenic air separation plant requires that high boiling contaminants, such as water, carbon dioxide and hydrocarbons, be removed from the feed air before entering a column. Water and carbon dioxide will freeze at the cryogenic temperatures associated with the air separation. Hydrocarbons constitute a safety hazard if there is a potential for accumulation in a boiling oxygen pool. One method for removing these contaminants uses a combination of reversing heat exchangers or regenerators and an adsorbent bed for final clean up. Reversing heat exchangers and regenerators work by freezing out contaminants and then periodically switching flow passages such that passages which were occupied with high pressure air now pass a low pressure waste stream going in the opposite direction. This waste stream is colder but being at low pressure it can evaporate the contaminants and clean the exchanger passages in readiness for the next flow reversal. These periodic switches result in a momentary loss of feed air flow to the column system since the passages at low pressure must be repressurized with air after the switch before being able to pass feed air to the column system. The magnitude of this upset is a function of the pressure ratio between the feed air and waste and the volume of the heat exchanger passages. The problem will typically be most severe with regenerators due to their large volume. The upset can be reduced by equalizing pressures but still a reduction in the feed air flow is experienced.

Most recently, adsorbent beds have been used to remove high boiling impurities from a feed air stream to a cryogenic air separation plant. These beds have the advantage that they do not require a substantial waste stream and therefore the feed air that comes in can be obtained essentially as two or three clean products. Two types of such prepurifiers are employed: Thermal Swing Adsorption (TSA) and Pressure Swing Adsorption (PSA). As the names imply, TSA depends primarily on heat to drive the adsorbed contaminants off the adsorbent whereas PSA uses differences in absolute pressure within the bed to cause the contaminants to desorb. Both are operated in a batchwise manner where air is passed through a clean bed and the bed loads up with contaminants which are then removed in a desorption step. Typically, two or more beds are used. To minimize the impact on the column system, the bed that is to come on line is pressurized for a period of a minute or so by bleeding air off the feed to the other bed. When the bed is at pressure all of the air is diverted to it. During this repressurization step the column experiences a reduced feed air flow. This is again a periodic disturbance that will cause an upset to the column. The frequency and magnitude of the upset will depend on the particular prepurifier system. Typically the upset will be greater with a PSA because the frequency of switching is on the order of minutes whereas that of a TSA is on the order of hours.

The periodic or occasional feed air flow disturbance into the plant causes liquid within the column or columns of the air separation plant to drain down the column internals and fall into the sump of the column, or at least to flow to a lower level within the column compared to steady operation, thereby causing the column to operate inefficiently, i.e. with a high height per equivalent theoretical plate (HETP).

Accordingly it is an object of this invention to provide a cryogenic air separation system which can operate efficiently despite periodic or occasional feed air flow disturbances into the plant.

SUMMARY OF THE INVENTION

The above and other objects, which will become apparent to one skilled in the art upon a reading of this disclosure, are attained by the present invention, one aspect of which is:

A method for carrying out cryogenic rectification of feed air comprising:

(A) passing feed air containing high boiling impurities to a prepurifier system and removing high boiling impurities from the feed air in the prepurifier system to produce clean feed air;

(B) flowing the clean feed air from the prepurifier system to a cryogenic air separation plant comprising at least one column and having mesh packing with mesh packing openings in at least some portion of at least one column;

(C) operating the prepurifier system in a manner so as to cause occasional disturbances in the flow of clean feed air from the prepurifier system to the cryogenic air separation plant; and (D) carrying out countercurrent vapor/liquid cryogenic rectification within the column(s) to produce at least one product from the feed air while retaining liquid within the mesh packing openings during the said disturbances in the flow of clean feed air from the prepurifier system to the cryogenic air separation plant.

Another aspect of the invention is:

An apparatus for carrying out cryogenic rectification of feed air comprising:

(A) a prepurifier system, means for providing feed air to the prepurifier system, and means for cleaning the prepurifier system so as to cause the prepurifier system to operate in a manner so as to cause feed air flow disturbances;

(B) a cryogenic air separation plant comprising at least one column, and means for flowing feed air from the prepurifier system to the cryogenic air separation plant;

(C) mesh packing having mesh packing openings in at least some portion of at least one column of the cryogenic air separation plant, said mesh packing openings capable of retaining liquid during said feed air flow disturbances; and (D) means for recovering at least one product from the cryogenic air separation plant;

As used herein, the term "feed air" means a mixture comprising primarily nitrogen, oxygen and argon, such as ambient air.

As used herein the term "column" means a distillation or fractionation column or zone, i.e. a contacting column or zone, wherein liquid and vapor phases are countercurrently contacted to effect separation of a fluid mixture. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase.

Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the upflowing vapor and downflowing liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein the term "indirect heat exchange" means the bringing of two fluid streams into heat exchange relation without any physical contact or intermixing of the fluids with each other.

As used herein the term "top condenser" means a heat exchange device that generates column downflow liquid from column vapor.

As used herein the terms "upper portion" and "lower portion" mean those sections of a column respectively above and below the midpoint of the column.

As used herein the term "regenerator" means a heat exchange device comprising a vessel containing material capable of storing heat, having a shell, and optionally one or more hollow coils passing therethrough. The coil side of the regenerator is the volume within the coil(s). The shell side of the regenerator is the volume within the shell but outside the coil(s).

As used herein the term "high boiling impurities" means one or more of water vapor, carbon dioxide and hydrocarbons.

As used herein the term "prepurifier system" means a system which removes high boiling impurities from feed air. Examples of prepurifier systems which may be used in the practice of this invention include regenerators, pressure swing adsorption beds, temperature swing adsorption beds, and reversing heat exchangers.

DETAILED DESCRIPTION

Figure 1:
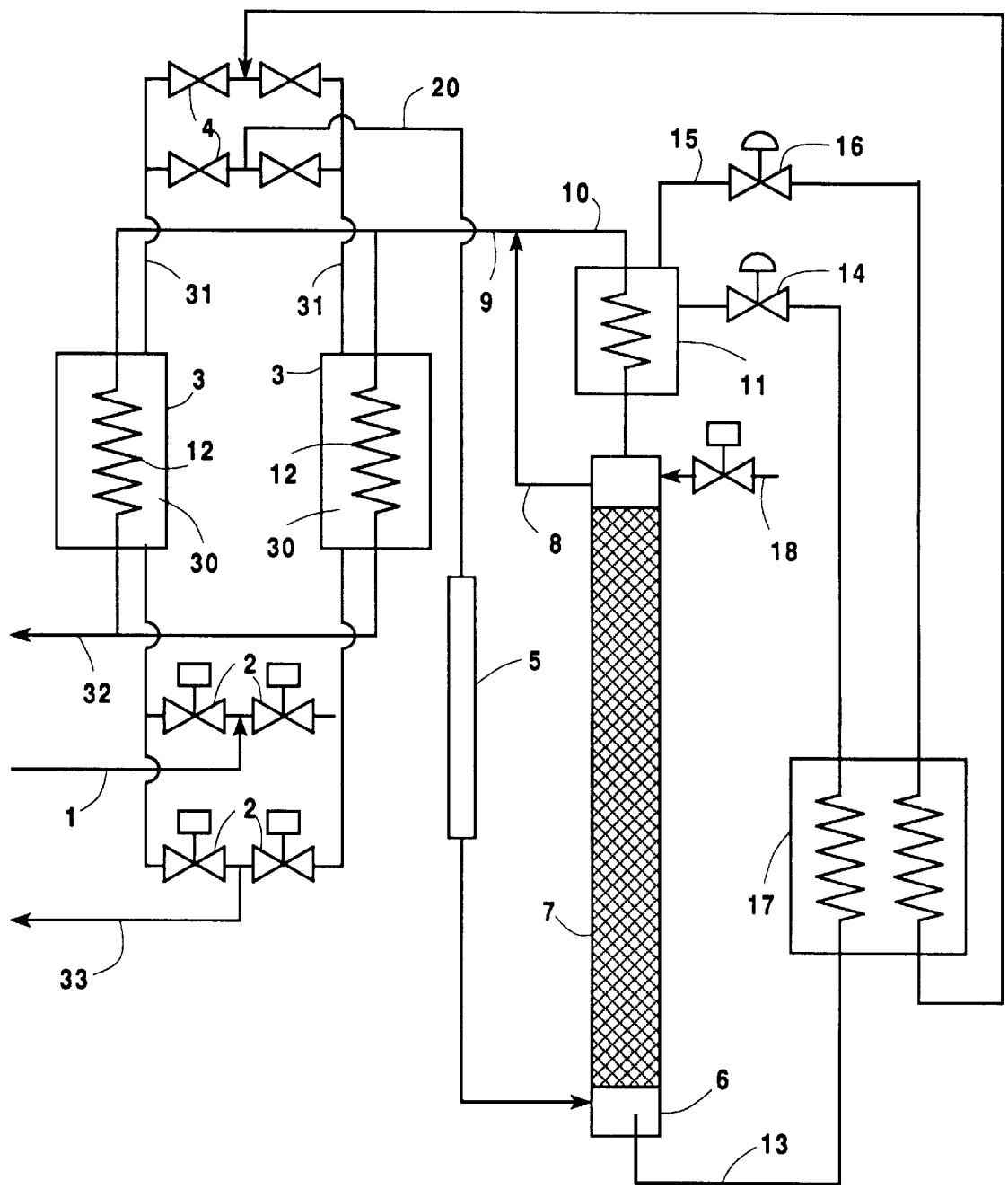
FIG. 1 is a schematic flow diagram of one preferred embodiment of the invention wherein the prepurifier system comprises regenerators and the cryogenic air separation plant has a single column.

The invention will be described in detail with reference to the Drawings. Referring now to FIG. 1, feed air is compressed to typically between 85 and 165 pounds per square inch absolute (psia), after which it is typically cooled and free water is removed. The compressed feed air stream 1 is then diverted through a switching valve 2 to the shell side 30 of one of a pair of regenerators 3, which generally contain a packing material, such as stones, within the shell. During such cooling period the feed air is cooled close to its dewpoint by passage through shell side 30 and all remaining water and most of the carbon dioxide is removed from the feed air by condensation. The cooled feed air is withdrawn from shell side 30 in stream 31 and is passed through check valve 4 in stream 20 to an adsorbent bed 5 for removal of hydrocarbons and any remaining carbon dioxide that exit with the feed air from the cold end of the regenerator. The adsorbent is typically a silica gel. The clean cold air is then passed into the lower portion of rectifying column 6 which contains mesh packing 7 as will be described in greater detail below. Column 6 is operating at a pressure within the range of from 85 to 165 psia. Within column 6 the feed air is separated by cryogenic rectification into nitrogen vapor and oxygen-enriched liquid.

Nitrogen vapor, having a nitrogen concentration of at least 95 mole percent, is withdrawn from the upper portion of column 6 as stream 8 and divided into a first portion or reflux stream 10 and a second portion or product stream 9. Reflux stream 10 passes to top condenser 11 wherein it is condensed and returned to column 6 as liquid reflux. Product stream 9 is passed into the coil side of regenerators 3 and through coils 12 which are imbedded inside the regenerator packing material. Warm product leaving the regenerators (typically 5–15K colder than the incoming feed air) is then withdrawn from the coil side of the regenerators and recovered as product nitrogen 32 at a flowrate generally within the range of from 30 to 60 mole percent of the incoming feed air flowrate and having a nitrogen concentration of at least 95 mole percent.

Oxygen-enriched liquid is withdrawn from the lower portion of column 6 as kettle liquid 13, and is pressure transferred to top condenser 11. This kettle liquid typically contains more than 30 mole percent oxygen. Preferably kettle liquid in stream 13 is subcooled by passage through heat exchanger 17 prior to being passed into top condenser 11. The boiling pressure inside top condenser 11 is significantly lower than the pressure at which column 6 is operating thus allowing the transfer of the kettle liquid. The rate of flow of the kettle liquid is governed by a flow restricting device such as a control valve 14. Additional adsorbent may be located in the kettle liquid transfer line or in the condenser for final scavenging of residual hydrocarbons and carbon dioxide. The oxygen-enriched liquid in the top condenser is boiled against the condensing nitrogen reflux stream. Top condenser 11 operates at a much reduced pressure over that of the column 6. Generally the pressure of the top condenser will be at least 10 psi less than that at which column 6 is operating. This reduces the boiling temperature of the oxygen stream to below the temperature at which the nitrogen vapor, at column pressure, condenses. The resulting oxygen-enriched vapor 15, which will be termed the waste, passes out of top condenser 11 through a control valve 16 that regulates the boiling side pressure and hence the column pressure. The waste then passes in countercurrent heat exchange relation with the rising kettle liquid in a heat exchanger or superheater 17. Waste then passes through check valves 4 and into the cold end of the shell side of the regenerator 3 which does not have feed air passing through it, i.e. during a non-cooling period. The regenerators will switch via switching valves 2 between feed air and waste in a periodic fashion so that each regenerator experiences both cooling and non-cooling periods. The waste is withdrawn from the system in stream 33. Typically the nitrogen vapor will pass through a regenerator during both the cooling and non-cooling periods.

Exogenous cryogenic liquid, which in the embodiment illustrated in FIG. 1 is liquid nitrogen having a nitrogen concentration of at least 95 mole percent, is added from an external source to the column through line 18 to provide refrigeration to the system. The flow of the exogenous cryogenic liquid is regulated to maintain the liquid level inside the condenser 11 and is within the range of from 2 to 15 percent of the flowrate of nitrogen product stream 32 on a molar basis. Alternatively, some or all of the required exogenous cryogenic liquid may be added to the top condenser.

Figure 2:
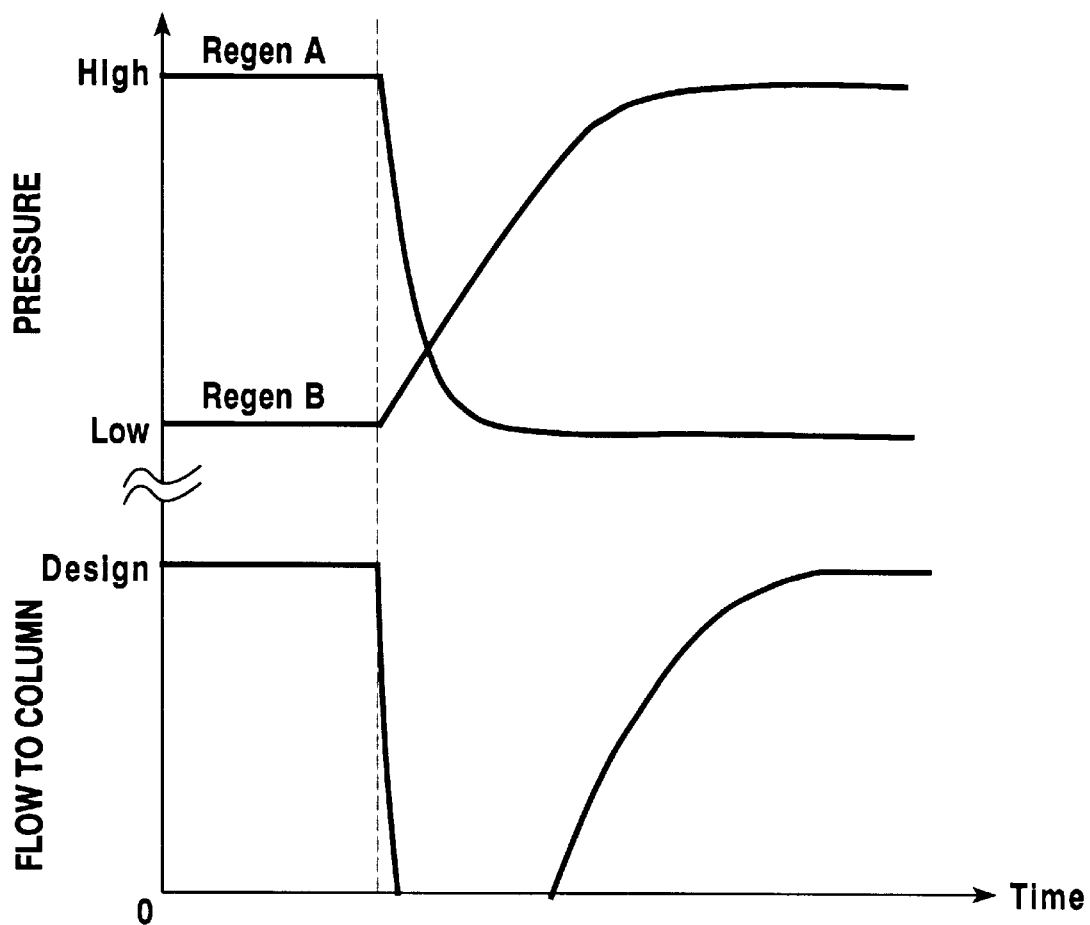
FIG. 2 is a diagram illustrating a typical feed air flow disturbance in the operation of the invention in accord with the embodiment illustrated in FIG. 1.

The regenerators work by periodically switching between a warm air feed and a cold waste stream. This is accomplished via switching valves 2. During the switch it is necessary to pressurize a regenerator from the waste stream pressure to column pressure before air will enter the column system. The situation is represented in FIG. 2. A first regenerator, termed regenerator A, is initially receiving feed air and is at high pressure. At the switch it blows down into the waste vent 33 until it is at the pressure of the waste stream.

A second regenerator, termed regenerator B, is initially at low pressure. It is fed with feed air following the switch. The pressure within this regenerator rises with time. However, feed air does not pass to the column until the pressure of regenerator B is at least at the column pressure. The flow of feed air to the column in line 20 is also shown on FIG. 2. The upset to the column is clearly shown.

Figure 3:
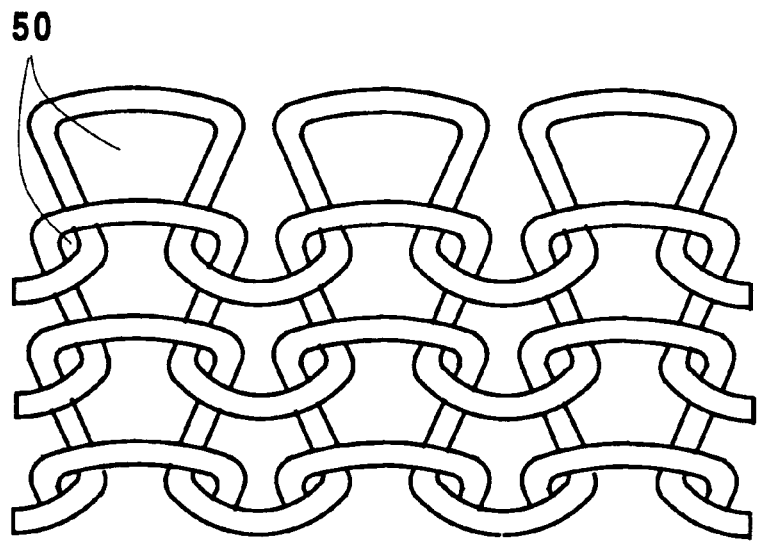
FIGS. 3 and 4 illustrate respectively knitted mesh packing and woven mesh packing which may be used in the practice of this invention.

Typically the time for repressurization is on the order of 5–25 seconds. The switching frequency is usually several minutes, generally in the range 3–15 minutes. During the disturbance, the feed air flow into the column is reduced and liquid within the column will tend to drain down due to the reduction in upflowing vapor within the column. This is particularly the case when sheet metal structured packing is used as the column internals. In order to counteract this tendency and avoid the disadvantageous consequences of such draining, the column contains mesh packing in at least a portion of the column and preferably, as illustrated in FIG. 1, throughout the column. The mesh packing is distinct from sheet metal structured packing that is commonly employed in cryogenic rectification columns in that it is composed of wires that are either woven or knitted together to form a fabric. Sheet metal packings, in contrast, are thin sheets of metal that are crimped and layered together to form structured elements. FIG. 3 illustrates one example of knitted mesh packing and FIG. 4 illustrates one example of woven or gauze mesh packing.

Figure 4:
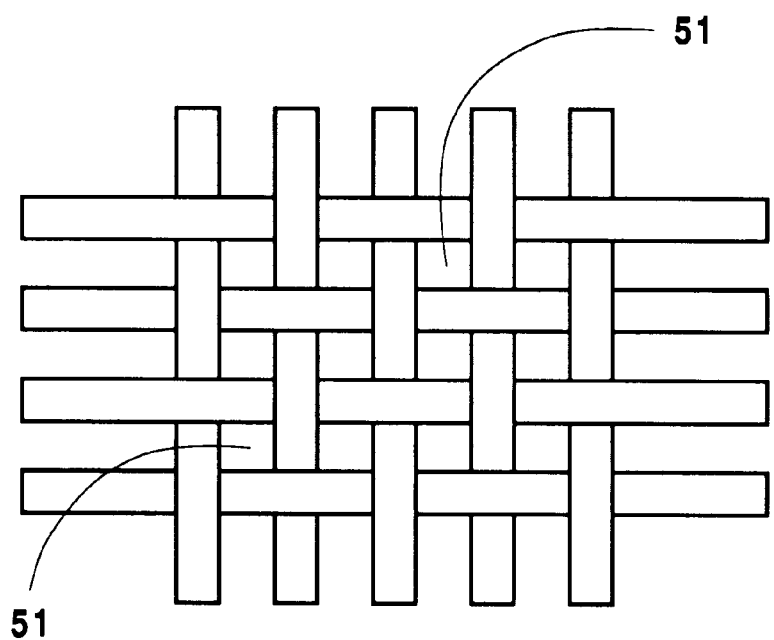

The mesh packing has small mesh packing openings between the wire strands as illustrated by numerals 50 and 51 in FIGS. 3 and 4 respectively. The optimum dimension of the mesh packing openings will be a function of the surface tension of the liquid being processed in the column. However, at least some mesh packing openings must be sufficiently small to retain liquid during the feed air flow disturbances. During the countercurrent liquid/vapor flow in carrying out cryogenic rectification within the column, the liquid spreads along the wires through capillary action and will, depending on the mesh dimensions, be held up in the mesh packing openings or interspacial regions formed by the crossing wires. In at least some of these openings, a continuous liquid film forms over the surface of the mesh packing and the liquid is prevented from draining during the feed air flow disturbances into the plant, thus reducing or eliminating entirely, the loss of efficiency which has heretofore resulted from such feed air flow disturbances. The mesh packings have a high static hold-up caused by the capillary action of the liquid on and between the wires. While some liquid continues to flow down, a significant fraction is held up in the packing. Thus changes in the composition profile in the column or the amount of liquid that drains to the column sump is reduced.

Figure 5:
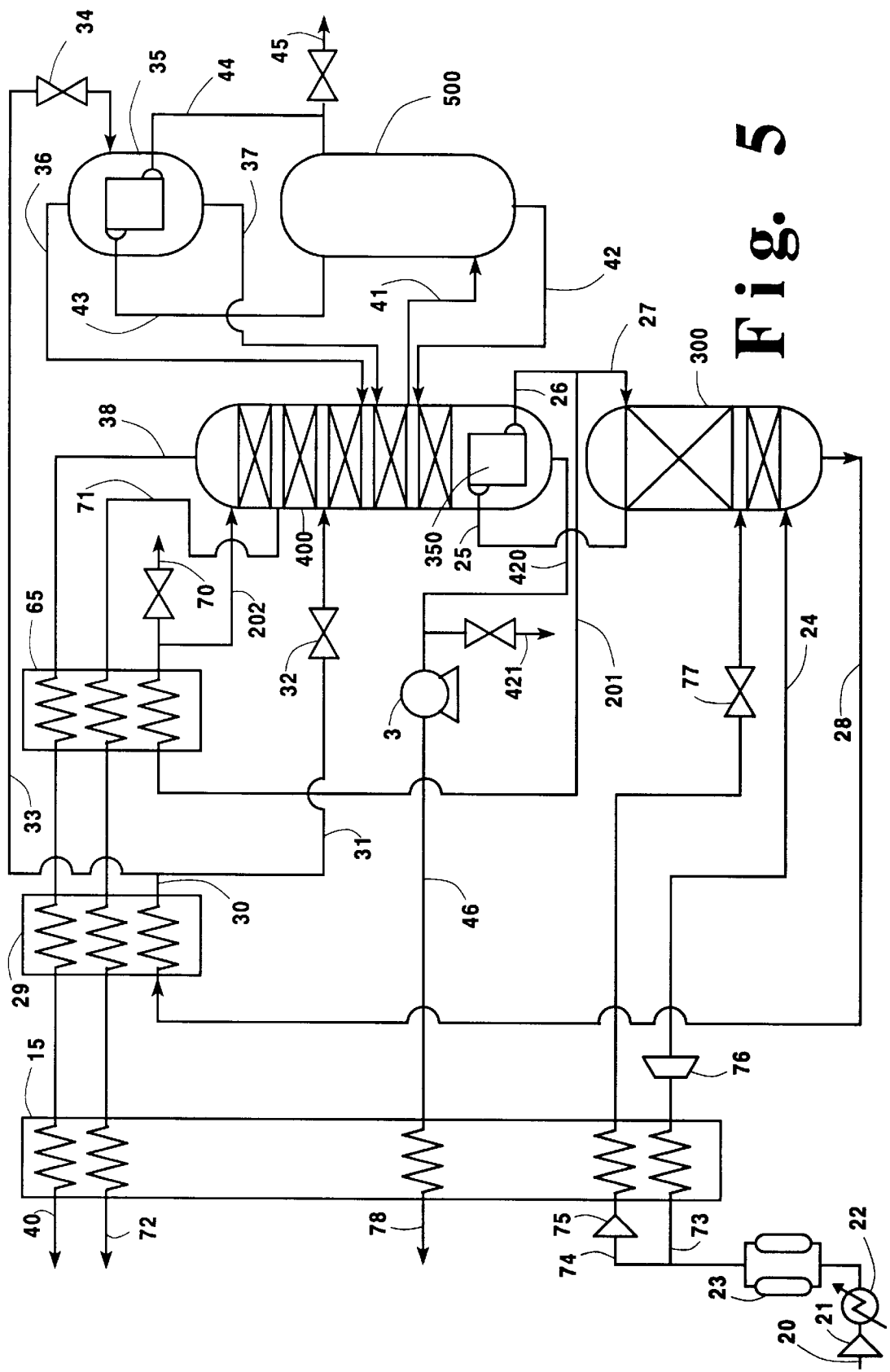
FIG. 5 is a schematic flow diagram of another preferred embodiment of the invention wherein the prepurifier system comprises pressure swing adsorption beds and the cryogenic air separation plant has three columns.

FIG. 5 illustrates an embodiment of the invention carried out with a cryogenic air separation plant having a plurality of columns. Referring now to FIG. 5, feed air 20 is compressed in compressor 21, cooled in cooler 22 and cleaned of high boiling impurities in prepurifier 23 which comprises pressure swing adsorption beds. The cleaned feed air is then divided into streams 73 and 74. Stream 74 is further compressed by passage through compressor 75 and then both streams are cooled by passage through primary heat exchanger 15 against return streams. Stream 73 is then turboexpanded by passage through turboexpander 76 and then passed as stream 24 into column 300 which is the higher pressure column of a double column system of a cryogenic air separation plant which also includes lower pressure column 400 and, in the embodiment illustrated in FIG. 5, argon column 500. Stream 74 is passed through valve 77 and then also passed into column 300.

Column 300 generally is operating at a pressure within the range of from 75 to 300 psia. Within column 300, the feed air is separated by cryogenic rectification into nitrogen-enriched top vapor and oxygen-enriched bottom liquid. As mentioned, the cryogenic rectification plant illustrated in FIG. 5 also includes a third column which in this case is an argon column for the production of crude argon. Nitrogen-enriched top vapor 25 is passed from column 300 into main condenser 350 wherein it is condensed against reboiling column 400 bottoms. Resulting liquid nitrogen 26 is passed in stream 27 as reflux into column 300, and in stream 201 through heat exchanger 65 into column 400 as reflux stream 202. If desired, a portion of stream 202 may be recovered as product liquid nitrogen. Oxygen-enriched liquid is passed in stream 28 from column 300 through heat exchanger 29, wherein it is subcooled by indirect heat exchanger with return streams, and resulting stream 30 is divided into first part 31, which is passed through valve 32 and into column 400, and into second part 33 which is passed through valve 34 into top condenser 35 of argon column 500. In top condenser 35, the oxygen-enriched liquid is partially vaporized and the resulting vapor and remaining liquid are passed into column 400 in streams 36 and 37 respectively.

Column 400 is operating at a pressure less than that of column 300 and generally within the range of from 15 to 60 psia. Within column 400 the fluids fed into column 400 are separated by cryogenic rectification into nitrogen-rich vapor and oxygen-rich liquid, i.e. liquid oxygen. Nitrogen-rich vapor or gaseous nitrogen is withdrawn from column 400 in line 38, warmed by passage through heat exchangers 65 and 29 and then passed through primary heat exchanger 15. If desired, some or all of this nitrogen may be recovered as product gaseous nitrogen 40. For product purity control purposes a waste stream 71 is withdrawn from column 400 below the withdrawal point of stream 38, passed through heat exchangers 65, 29 and 15, and removed from the system in stream 72.

An argon containing fluid is passed from column 400 to argon column 500 in line 41, and is separated by cryogenic rectification in argon column 500 into argon-richer vapor and oxygen-richer liquid. The oxygen-richer liquid is returned to column 500 by line 42. Argon-richer vapor is passed in line 43 into top condenser 35 wherein it is partially condensed by indirect heat exchange with the oxygen-enriched fluid. Resulting argon-richer fluid is passed in stream 44 into column 500 as reflux and a portion 45 is recovered as product crude argon having an argon concentration of at least 90 mole percent. Although the system described produces crude argon, i.e. having some remaining oxygen and nitrogen, columns 400 and 500 could contain additional separation stages so that the argon produced would be product grade, i.e. having oxygen and nitrogen content less than 5 ppm.

Liquid oxygen is withdrawn from column 400 in line 420 and pumped to a higher pressure by passage through liquid pump 3 generally to a pressure within the range of from 50 to 500 psia. The resulting pressurized liquid oxygen stream 46 is then passed through main heat exchanger 15 wherein it is vaporized. Resulting elevated pressure gaseous oxygen 78 is recovered as product oxygen gas. If desired, some liquid oxygen may also be recovered as indicated by line 421.

Pressure swing adsorption prepurifiers utilize two or more adsorbent beds to clean the incoming feed air of high boiling impurities. One bed is processing the pressurized feed air while the other is being regenerated with low pressure sweep gas, typically waste nitrogen such as the fluid in stream 72 of FIG. 5. When one bed is fully regenerated and the other bed is close to fully loaded, a portion of the feed air is diverted to the low pressure bed to bring it up to feed air pressure level. Then all the feed air is directed to the new pressurized bed and the other bed is blown down to the atmosphere prior to regeneration with the low pressure waste stream. This changeover sequence results in a feed air flow decrease to the columns during the pressurization of the regenerated bed and has a negative impact on column performance by causing liquid drainage in the columns. The liquid drainage is countered by the use of the mesh packings within the columns.

The mesh packing which is useful in the practice of this invention may be made of metal such as stainless steel, aluminum, brass and copper. Stainless steel is preferred. Other materials which may be used to make the mesh packing include ceramic, cellulose and carbon fibers.

When used in a column, it is preferred that the mesh packing be used throughout the column. However, if desired, the mesh packing may be used in only a portion or some portions of the column, with the remaining portion or portions of the column containing other mass transfer internals such as sheet metal structured packing.

It is believed that the invention will find its greatest utility in smaller single column cryogenic air separation plants, although the invention may be employed in conjunction with larger or multi-column cryogenic air separation plants. The invention will also alleviate separation inefficiencies caused by feed air flow disturbances generated by other than prepurifier operation, such as those caused by compressor surges.

Although the invention has been described in detail with reference to certain preferred embodiments, those skilled in the art will recognize that there are other embodiments of the invention within the spirit and the scope of the claims.

We claim:

1. A method for carrying out cryogenic rectification of feed air comprising:
   (A) passing feed air containing high boiling impurities to a prepurifier system and removing high boiling impurities from the feed air in the prepurifier system to produce clean feed air;
   (B) flowing the clean feed air from the prepurifier system to a cryogenic air separation plant comprising at least one column and having mesh packing with mesh packing openings in at least some portion of at least one column;
   (C) operating the prepurifier system in a manner so as to cause occasional disturbances in the flow of clean feed air from the prepurifier system to the cryogenic air separation plant; and
   (D) carrying out countercurrent vapor/liquid cryogenic rectification within the column(s) to produce at least one product from the feed air while retaining liquid within the mesh packing openings during the said disturbances in the flow of clean feed air from the prepurifier system to the cryogenic air separation plant.

2. The method of claim 1 wherein said at least one product comprises nitrogen.

3. The method of claim 1 wherein said at least one product comprises oxygen.

4. An apparatus for carrying out cryogenic rectification of feed air comprising:
   (A) a prepurifier system, means for providing feed air to the prepurifier system, and means for cleaning the prepurifier system so as to cause the prepurifier system to operate in a manner so as to cause feed air flow disturbances;
   (B) a cryogenic air separation plant comprising at least one column, and means for flowing feed air from the prepurifier system to the cryogenic air separation plant;
   (C) mesh packing having mesh packing openings in at least some portion of at least one column of the cryogenic air separation plant, said mesh packing openings capable of retaining liquid during said feed air flow disturbances; and
   (D) means for recovering at least one product from the cryogenic air separation plant.

5. The apparatus of claim 4 wherein the prepurifier system comprises regenerators.

6. The apparatus of claim 4 wherein the prepurifier system comprises pressure swing adsorption beds.

7. The apparatus of claim 4 wherein the mesh packing comprises knitted mesh packing.

8. The apparatus of claim 4 wherein the mesh packing comprises woven mesh packing.

9. The apparatus of claim 4 wherein the cryogenic air separation plant comprises a single column.

10. The apparatus of claim 4 wherein the cryogenic air separation plant comprises at least two columns.

* * * * *